United States Patent Office 3,324,183
Patented June 6, 1967

3,324,183
N,N-BIS(2-HYDROXYETHYL) HIGHER ALKYL AMINE OXIDES
Hill M. Priestley, North Bergen, N.J., assignor to Lever Brothers Company, New York, N.Y., a corporation of Maine
No Drawing. Filed Feb. 24, 1966, Ser. No. 529,639
4 Claims. (Cl. 260—584)

This application is a continuation-in-part of application Ser. No. 183,004, filed Mar. 22, 1962, now abandoned, which in turn is a continuation-in-part of application Ser. No. 26,976, filed May 5, 1960.

The present invention relates to novel amine oxides and more particularly to hydroxylated amine oxides.

It has now been found that certain novel hydroxylated amine oxides can be prepared having the unexpected properties of producing copious and stable aqueous foams, of rapidly boosting and stabilizing the foam produced by agitating aqueous solutions of suds-producing organic synthetic detergents, of forming detergent compositions which are clear and homogeneous at room temperature, and of forming liquid detergent compositions having high synergistic dishwashing capacity.

The novel hydroxylated amine oxides of this invention are N,N-bis(2-hydroxyethyl)-dodecylamine oxide; N,N-bis(2-hydroxyethyl)-tetradecylamine oxide; and N,N-bis (2-hydroxyethyl)-cocoamine oxide, i.e., the hydroxylated amine oxide prepared from the naturally occurring mixture of fatty acids present in coconut oil.

The compounds described above are readily prepared from "practical" grade raw materials. Slightly improved results may be obtained by using compounds of greater purity, although the improved results may be offset by the additional processing costs.

These hydroxylated amine oxides are solids at room temperature and are readily purified by crystallization techniques. Being solids, they can be mechanically added to powdered detergent formulations with ease.

The hydroxylated amine oxides may be prepared by any of the well-known procedures. Suitable methods for preparation are found, for example, in the Guenther et al. United States Patent No. 2,169,976. Thus, the N,N-bis(2-hydroxyethyl)-dodecylamine oxide may be prepared according to the processes described in the Guenther et al. patent. Where products of high purity are desired, N,N-bis(2-hydroxyethyl)-dodecylamine may be prepared from (1) dodecyl bromide and diethanol amine (U.S. Patent No. 2,541,088), or (2) from dodecylamine and 2 moles of ethylene chlorohydrin, and this material used as a starting material. Another suitable starting material is obtained by the adding on of 2 moles of ethylene oxide to the mixture of long chain amines obtained from coconut oil. Ethomeen C–12 is a coconut oil amine and is stated to have the structure $C_{12}H_{25}N(CH_2CH_2OH)_2$.

In a typical process, a mixture of 13 grams of N,N-bis(2-hydroxyethyl)-dodecylamine, 26 grams of 30% hydrogen peroxide and 26 ml. of ethyl alcohol (95%) was allowed to stand at room temperature for one-half hour. A test showed that the product was then completely soluble in water. After an additional hour at room temperature, the mixture was concentrated on a water bath at 30–45° C. under a vacuum furnished by a water pump. When foaming became troublesome, 25 ml. of 95% ethyl alcohol was added and the removal of the solvent was continued. The residue in the flask (weight 19 grams) was transferred to an evaporating dish and dried in a vacuum desiccator over fresh sulphuric acid. The yield was 14.2 g. of a hydrated amine oxide having a melting point of 55° C. One gram of the hydrated material was crystallized from 10 ml. of ethyl acetate, giving 0.8 gr. of stable crystals having a melting point of 59° C. A sample was redried at 45° C. in vacuo. The calculated values for $C_{16}H_{35}NO_3$ were: carbon, 66.39%; hydrogen, 12.19%; and nitrogen, 4.84%. The actual values found by analysis were: carbon, 66.66%; hydrogen, 11.93%; and nitrogen, 4.91%.

The following Examples 1 and 2 illustrate representative detergent compositions containing hydroxylated amine oxides of this invention.

EXAMPLE 1

N,N-bis(2-hydroxyethyl)-dodecylamine oxide, $$C_{12}H_{25}NO(CH_2CH_2OH)_2$$

was used in a light duty liquid detergent composition. The exact formulation is given in the following table.

| Ingredient: | Percent |
|---|---|
| Ammonium dodecylbenzene sulfonate | 17.14 |
| Alipal [1] (active) | 11.87 |
| $C_{12}H_{25}NO(CH_2CH_2OH)_2$ | 6.00 |
| Ethyl alcohol, 100% | 12.00 |
| Perfume | .20 |
| Water and miscellaneous ingredients | 52.79 |
| | 100.00 |

[1] Ammonium salt of sulfated nonyl phenol condensed with 4 moles of ethylene oxide.

EXAMPLE 2

This example describes a liquid detergent composition containing one of the hydroxylated amine oxides of this invention.

Formula

| | Percent |
|---|---|
| Ammonium dodecylbenzene sulfonate (active) | 17.28 |
| Ammonium salt of sulfated dodecylphenol condensed with 6 moles ethylene oxide (active) | 11.87 |
| Ethomeen, $C_{12}$ amine oxide $C_{12}H_{25}NO(CH_2CH_2OH)_2$ (active) | 5.00 |
| Ethyl alcohol, 100% | 14.80 |
| Water, $NH_4OH$, etc. | 51.05 |
| | 100.00 |

The following comparative Examples 3 through 5 illustrate the unexpected properties of the hydroxylated amine oxides of the invention in producing copious and stable aqueous foams.

EXAMPLE 3

The test procedure employed in this Example consisted of placing 25 ml. of a 0.01% aqueous solution of the hydroxylated amine oxides set forth in the table below in a 50 ml. glass-stoppered graduated cylinder, and shaking the cylinder vigorously for 30 seconds. The cylinder was then allowed to remain at rest and the foam volume was measured immediately and again after 1, 5 and 10 minutes.

| Run No. | | Distilled Water, Foam Volumes (ml.) | | | |
|---|---|---|---|---|---|
| | | Time (minutes) | | | |
| | | 0 | 1 | 5 | 10 |
| 1 | Bis(2-hydroxyethyl)-cocoamine Oxide | 28 | 28 | 28 | 28 |
| 2 | Bis(2-hydroxyethyl)-dodecylamine Oxide | 17 | 16½ | 16 | 16 |
| 3 | Bis(2-hydroxyethyl-tetradecylamine Oxide | 25 | 25 | 24½ | 24½ |
| 4 | Bis(2-hydroxyethyl)-hexadecylamine Oxide | 7 | 7 | 7 | 7 |

The comparative data set forth in the above table clearly establish that the three hydroxylated amine oxides of the invention (Run Nos. 1, 2 and 3) procduced copious and stable aqueous foams. When these copious and stable aqueous foam volumes of the three hydroxylated amine oxides of the invention (Run Nos. 1–3) are compared with the foam volumes produced by a heretofore known homologous hydroxylated amine oxide (Run No. 4), it is evident that the hydroxylated amine oxides of the invention produce a foam volume which is from 200% to 400% greater than that produced by the heretofore known homologous hydroxylated amine oxide.

EXAMPLE 4

For this cylinder foaming test, 0.5% and 0.25% aqueous solutions of the dodecyl, hexadecyl, and oleyl bis (2-hydroxyethyl)-amine oxides were prepared both in distilled water (D.W.) and in water of 180 p.p.m. hardness calculated as $CaCO_3$ (⅔ Ca, ⅓ Mg).

To generate the foam, 20 ml. of the solutions at the indicated concentrations were placed in a 100 ml. glass-stoppered graduated cylinder and shaken by hand at a moderate rate for 15 seconds. The cylinder was then placed upright on the bench and the foam height read immediately and again after 5 minutes. The tests were made at room temperature. The figures presented in the table below (in contrast to those set forth in the table of Example 3) are the total volumes in milliliters of solution and foam.

ure of the relative stability of the foams. The observed foam volumes are shown in the table below. As indicated by their magnitude, the figures represent actual foam volumes only, and do not include the solution volumes.

The detergent products had the following composition:

| Components: | Percent by Weight |
|---|---|
| Amine oxide | 17.62 |
| Sodium toluene sulfonate | 2.5 |
| Sodium tripolyphosphate | 10.0 |
| Tetrasodium pyrophosphate | 30.0 |
| Sodium silicate (solids) | 5.9 |
| Sodium carboxymethyl cellulose | 0.4 |
| Sodium sulfate | 27.5 |
| Water and misc. impurities associated with the components | Balance |

The foaming results were as follows:

| Run No. | Amine Oxide | Foam Vol. ml., 120° F. | |
|---|---|---|---|
| | | F.F.[1] | F.S.[2] |
| 1 | Bis(2-hydroxyethyl)-cocoamine Oxide | 90 | 65 |
| 2 | Bis(2-hydroxyethyl)-dodecylamine Oxide | 70 | 35 |
| 3 | Bis(2-hydroxyethyl)-tetradecylamine Oxide | 65 | 45 |
| 4 | Bis(2-hydroxyethyl)-hexadecylamine Oxide | 10 | 5 |

[1] F.F.=Foam formation after 15 minutes agitation.
[2] F.S.=Foam stability (vol. after 5 minutes at rest).

| Concentration and Time | Dodecyl | | Hexadecyl | | Oleyl | |
|---|---|---|---|---|---|---|
| | D.W. | 180 p.p.m. | D.W. | 180 p.p.m. | D.W. | 180 p.p.m. |
| 0.5%: | | | | | | |
| 0 min | 110 | 110+ | 26 | 34 | 25 | 29 |
| 5 min | 110 | 110+ | 26 | 34 | 25 | 29 |
| 0.25%: | | | | | | |
| 0 min | 95 | 100 | 28 | 38 | 24 | 31 |
| 5 min | 95 | 100 | 28 | 38 | 24 | 31 |

The comparative data set forth in the table above establish that the representative bis(2-hydroxyethyl)-dodecylamine oxide of the invention produces a copious and stable aqueous foam having a volume in this test procedure which is about 400% greater than that produced by the two heretofore known homologous bis(2-hydroxyethyl)-hexadecyl amine oxide and the bis(2-hydroxyethyl)-oleyl amine oxide.

EXAMPLE 5

The detergent products described below were tested for sudsing by a cylinder method in which the suds are generated by subjecting the solution contained in a vertically placed graduated cylinder about 6 centimeters in diameter and shortened to 560 ml. to the action of a piston mechanically operated at 22 complete strokes, or cycles, per minute. Solutions having a concentration equivalent to 3.59 ounces of detergent product per 16 gallons of 180 p.p.m. hard water were prepared. 190 ml. of the solution were placed in the cylinder, and 0.05% (basis solution) of vacuum cleaner dust was added. (The piston occupies 10 ml.) The piston was operated for 15 minutes, whereupon the piston action was stopped with the piston immersed in the solution, and the foam volume observed. The system was allowed to remain undisturbed for 5 minutes and the foam volume again observed as a meas- The comparative data set forth in the above table establish that detergent products containing the hydroxylated amine oxides of the invention (Run Nos. 1, 2 and 3) as the organic detergent component form copious and stable aqueous foams which are from 600% to 900% greater than that formed by detergent products containing a heretofore known homologous hydroxylated amine oxide (Run No. 4) as the organic detergent component.

The following Example 6 demonstrates that the hydroxylated amine oxides of the invention (Run Nos. 2, 3 and 4) possess the unexpected property of rapidly (within 2 minutes of agitation) boosting and stabilizing the foam produced by agitating an aqueous solution of a suds-producing organic synthetic detergent (Control Run No. 1) to a greater extent than that possible with a heretofore known homologous hydroxylated amine oxide (Run No. 5).

EXAMPLE 6

The detergent product tested in this example had the following composition.

| Components: | Percent by weight |
|---|---|
| Sodium tetrapolypropylene benzene sulfonate | 10.1 |
| Sodium tallow sulfate | 7.7 |
| Sodium tripolyphosphate | 14.9 |
| Tetrasodium pyrophosphate | 29.7 |
| Sodium silicate solids ($SiO_2:Na_2O=2.4$) | 5.9 |
| Sodium carboxymethylcellulose | 0.5 |
| Fluorescent dye | 0.02 |
| Sodium carbonate | 3.0 |
| Sodium sulfate | 11.11 |
| Water | 6.9 |
| Misc. inerts associated with the components | 7.17 |
| Sub total | 97.00 |
| Percent amine oxide | 3.00 |
| Total | 100.00 |

The three hydroxylated amine oxides of the invention were tested against the heretofore known homologous bis(2-hydroxyethyl)-hexadecyl amine oxide in cold water (room temperature). The test consisted of mixing 3% by weight of the amine oxide with 97% by weight of the detergent composition given above, preparing a 0.13 weight per volume percent aqueous solution thereof, and observing the amount of suds produced upon agitation of the solution for 2 minutes in a Terg-O-Tometer.

The Terg-O-Tometer test involved empirical measurement of the amount of foam produced under simulated fabric washing conditions. The ratings given in this test are as follows:

*Terg-O-Tometer ratings*

| | |
|---|---|
| 0 | No bubbles. |
| + | Trace. |
| ½ | Trace to 25% of surface coverage. |
| 1 | 25% to 50% surface coverage. |
| 1½ | 50% to 100% surface coverage. |
| 2 | Complete surface coverage. |

Stated sizes of cloth were placed in a miniature washing machine and were laundered in the presence of a measured amount of a standard soil preparation and water of a standard hardness. In these experiments, twelve pieces of cloth 6.5 inches by 4.25 inches, 1.75 grams of vacuum cleaner soil, and water of 180 p.p.m. hardness were employed. The concentration of total product was 1.3 grams per liter made up of 1.26 grams of the base formula set forth above plus 0.04 grams of the respective hydroxylated amine oxides set forth below.

TERG-O-TOMETER TEST RESULTS

| Run No. | | 2 Minutes of Agitation |
|---|---|---|
| 1 | Base Formula (Control) | 0 |
| 2 | Bis(2-hydroxyethyl)-cocoamine Oxide | ½ |
| 3 | Bis(2-hydroxyethyl)-dodecylamine Oxide | ½ |
| 4 | Bis(2-hydroxyethyl)-tetradecylamine Oxide | 1 |
| 5 | Bis(2-hydroxyethyl)-hexadecylamine Oxide | 0 |

The following Example 7 demonstrates that the hydroxylated amine oxides of the invention form liquid detergent compositions which are clear and homogeneous at room temperature (72° F.) which is not true of the same detergent compositions containing heretofore known homologous hydroxylated amine oxides or such detergent compositions free of a hydroxylated amine oxide of the invention.

EXAMPLE 7

Homogeneous solutions were obtained by warming the following ingredients in the following three formulations on a water bath at 55° C. with stirring:

*Formulation No. I*

| Components: | Percent by weight |
|---|---|
| Potassium sulfate of the condensate of $C_{12}$–$C_{14}$ fatty alcohol with 3 moles of ethylene oxide | 15.0 |
| Bis(2-hydroxyethyl)-dodecylamine oxide | 1.8 |
| Tetrapotassium pyrophosphate | 14.5 |
| Water | 68.7 |
| Total | 100.0 |

*Formulation No. II*

| Components: | Percent by weight |
|---|---|
| Sodium lauryl sulfate | 3.53 |
| Bis(2-hydroxyethyl)-dodecylamine oxide | 7.06 |
| Tetrapotassium pyrophosphate | 7.06 |
| Water | 82.35 |
| Total | 100.00 |

*Formulation No. III*

| Components: | Percent by weight |
|---|---|
| Sodium lauryl sulfate | 6.4 |
| Bis(2-hydroxyethyl)-dodecylamine oxide | 6.4 |
| Tetrapotassium pyrophosphate | 6.4 |
| Water | 80.8 |
| Total | 100.0 |

The above three formulations remained clear and fluid when cooled to room temperature (72° F.).

When, in the above three formulations, the representative bis(2-hydroxyethyl)-dodecylamine oxide of the invention was replaced by the heretofore known homologous bis(2-hydroxyethyl)-hexadecyl amine oxide or by bis(2-hydroxyethyl)-oleyl amine oxide, or when no amine oxide was used, the resulting mixtures were not homogeneous at 72° F.

The following Example 8 demonstrates that a representative hydroxylated amine oxide of the invention forms liquid detergent compositions having appreciably higher dishwashing capacity than liquid detergent compositions formed by using heretofore known homologous hydroxylated amine oxides.

EXAMPLE 8

The following comparative liquid detergent formulations were prepared for testing of their dishwashing capacity:

| | Percent by Weight | | | | | | |
|---|---|---|---|---|---|---|---|
| Formula No. | 1 | 2 | 3 | 4 | 5 | 6 | 7 |
| Ammonium Dodecylbenzene Sulfonate | 25 | | 25 | 25 | 25 | | |
| Bis(2-hydroxyethyl)-dodecylamine Oxide | | 8 | 8 | | | | |
| Bis(2-hydroxyethyl)-hexadecylamine Oxide | | | | 8 | | 8 | |
| Bis(2-hydroxyethyl)-oleylamine Oxide | | | | | 8 | | 8 |
| Ethyl Alcohol (denatured) | 1 | 1 | 1 | 1 | 1 | 1 | 1 |
| $H_2O$, etc. (by diff.) | 74 | 91 | 66 | 66 | 66 | 91 | 91 |
| Total | 100 | 100 | 100 | 100 | 100 | 100 | 100 |

The standard dishwashing test used in this example measures the number of soiled dinner plates washed with a detergent formulation under standard conditions. The standard soil employed in this test was a uniform blend of 9 parts by weight of emulsifier-free vegetable shortening, 8 parts by weight of bread flour and green coloring matter. A teaspoonful of the standard soil was spread evenly over the unsoiled plate. About 6 quarts of water of 120 p.p.m. hardness was heated to about 116° F. and a measured amount (6 grams) of the detergent composition was added. The number of standardly soiled plates washed in this solution according to standardized washing technique gives an indication of the effectiveness of the solution. The end point it reached when the foam no longer completely covers the surface of the washing solution.

DISHWASHING TEST RESULTS

| Formulation No. | 1 | 2 | 3 | 4 | 5 | 6 | 7 |
|---|---|---|---|---|---|---|---|
| Number of plates washed | 20 | 7 | 36 | 26 | 6 | 4 | 2 |

The above test data establish that a representative hydroxylated amine oxide of the invention forms a liquid detergent composition (Formulation No. 3) having a synergistic dishwashing capacity (Formulation No. 3 versus Nos. 1 and 2) from 150% to 600% greater than that of such a composition containing the heretofore known homologous hydroxylated amine oxides (Formulations Nos. 4 and 5).

What is claimed is:
1. An amine oxide selected from the group consisting of N,N-bis(2-hydroxyethyl)-dodecylamine oxide; N,N-bis(2-hydroxyethyl)-tetradecylamine oxide; and N,N-bis(2-hydroxyethyl)-cocoamine oxide.
2. N,N-bis(2-hydroxyethyl)-dodecylamine oxide.
3. N,N-bis(2-hydroxyethyl)-tetradecylamine oxide.
4. N,N-bis(2-hydroxyethyl)-cocoamine oxide.

References Cited
UNITED STATES PATENTS 2,185,163 12/1939 Ulrich.
3,098,794 7/1963 Dohr et al.

CHARLES B. PARKER, *Primary Examiner.*
RICHARD L. RAYMOND, *Assistant Examiner.*